United States Patent Office 2,761,138
Patented Aug. 28, 1956

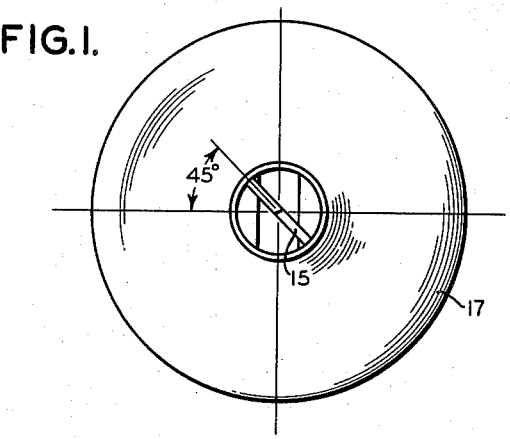
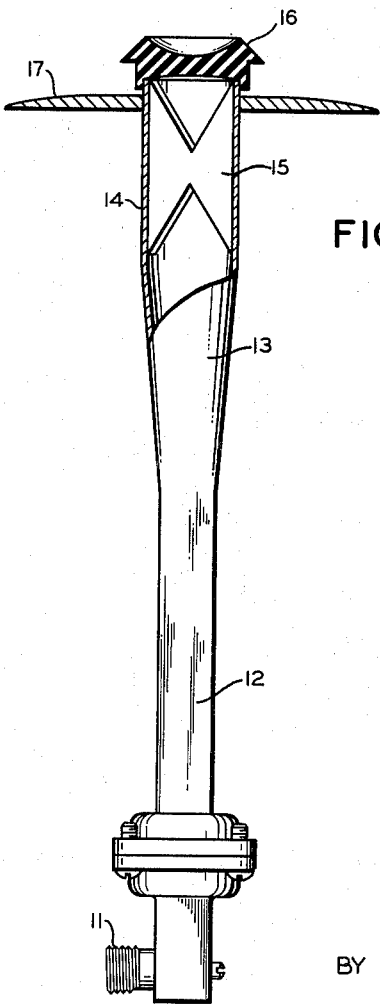

2,761,138

ISOTROPIC RADIATOR

Dora F. Sherman, Ithaca, N. Y., assignor, by mesne assignments, to the United States of America as represented by the Secretary of the Navy Application May 10, 1946, Serial No. 668,663

7 Claims. (Cl. 343—781)

This invention relates to radar antennas and more particularly to a radar antenna capable of producing isotropic radiation over a hemisphere.

To simulate targets that are visible to an airborne radar system, whether the antenna of the radar system be vertically or horizontally polarized, and irrespective of the position of the plane, it is desirable to have an antenna which will produce radiation that is either horizontally or vertically polarized and of uniform intensity at every point over a hemisphere. The requirement of horizontal polarization, alone, at every point on a hemisphere presents a problem, for a vector representing horizontal polarization to a radar system approaching it from a given direction lies perpendicular to the vector representing horizontal polarization to another system approaching from a direction 90 degrees from the first. Yet both radar systems must "see" horizontal polarized radiation. A similar problem exists in meeting the requirement of having vertical polarization at all points. To circumvent this difficulty, it is desirable that the radiation from the antenna be circularly polarized, but heretofore no antenna has been available to produce a uniform intensity radiation pattern over a hemisphere. The antenna of this invention produces isotropic radiation over a hemisphere.

Accordingly, the primary object of the present invention is to provide a radar antenna that produces a uniform intensity radiation pattern over a hemisphere.

Another object of the present invention is to provide a radar antenna which produces a radiation pattern horizontally polarized and of uniform intensity at every point over a hemisphere.

A further object is to provide a radar antenna which produces a radiation pattern vertically polarized and of uniform intensity at every point over a hemisphere.

The foregoing and other objects will become apparent from the detailed description when taken with the accompanying drawings in which:

Fig. 1 is a top view with the lens removed, of one embodiment of the invention; and Fig. 2 is a cutaway side elevation of the invention.

Referring to the drawings, the antenna of the present invention consists essentially of a section of cylindrical wave guide 14 to which is joined by a suitable transition section 13 a section of rectangular wave guide 12. The rectangular wave guide is energized from a source of wave energy through coaxial fitting 11, energy being launched into the rectangular wave guide by a probe or other suitable coupling means. Positioned within the cylindrical section of wave guide near one end thereof are phase-shifting means, preferably constructed in the form of a wedge 15 of polystyrene or similar dielectric material, for converting wave energy having plane polarization to circularly polarized energy in the manner to be described in more detail hereinbelow. A diverging lens 16, constructed of dielectric material to permit passage of wave energy therethrough, and preferably of a double concave configuration is mounted in the aperture of the circular wave guide. A metallic reflector 17 having an upper surface in the shape of a convex paraboloid is mounted coaxially with the cylindrical wave guide at a point closely behind the lens 16.

Rectangular wave guide 12 is excited in the $TE_{01}$ mode by coaxial fitting 11 which is connected to a source of electromagnetic energy by a coaxial line. In the gradual mechanical transition from rectangular wave guide 12 to circular wave guide 14, there is also a continuous transformation of electric field configuration, and the $TE_{11}$ mode results in the circular guide. The effect of polystyrene wedge 15 is essentially described in copending application Serial Number 504,776, filed October 2, 1943, by Carol G. Montgomery, Dorothy D. Montgomery, and Edward M. Purcell, now Patent No. 2,607,849 issued August 19, 1952. Circular polarization is obtained by placing wedge 15 in circular guide 14 at an angle of 45 degrees to the plane of polarization of the incident wave. The effect of this wedge is to retard the component of the electric field vector parallel to it, so that it emerges 90 degrees out of phase with the unretarded component perpendicular to the wedge. Since the magnitudes of these two components are essentially equal, the resulting wave is circularly polarized.

To produce the desired elevation radiation pattern constant over 180 degrees, a double concave polystyrene lens is placed over the aperture of the circular wave guide horn. By proper selection of radii of curvature of the lens the width of the radiated beam can be made approximately double that obtained from a bare aperture. The radiation pattern is further broadened by placing metallic convex parabolic reflector 17 behind the lens, a short distance from the open end of the horn. Reflector 17 reflects back radiation out to the sides, thus widening the elevation radiation pattern and eliminating back lobes. Since the aperture as well as the polarization of the electric vectors is circular the resulting radiation pattern takes essentially the shape of a hemisphere.

As mentioned above, this antenna can be used in the training of men in the use of radar, in marking the location of important landmarks as radar navigational aids, or in marking the positions of rapidly changing front lines in such a way that they are equally visible from the air in any direction. It might also be used in a beacon designed to be dropped from a lead plane instead of flares to mark the location of a target to be bombed by radar means.

The foregoing description of the invention should not be construed as a definition of the invention, but is considered illustrative of one form the invention may take.

What is claimed is:

1. A radio antenna system comprising a circular wave guide radiating horn, a dielectric wedge mounted in said wave guide at an angle of 45 degrees to the plane of the electric intensity vectors in said wave guide, said configuration of said wedge producing circular polarization of the radiated energy from said horn, a double concave dielectric lens, said lens mounted at the aperture of said radiating horn, the axis of said lens being coincident with the axis of said wave guide, and a metallic convex parabolic reflector, said reflector mounted behind said lens with its axis coincident with the axis of said wave guide, said combination of said horn, said lens, and said reflector being adapted to produce a radiation pattern of uniform intensity at all points over a hemisphere.

2. A radio antenna system comprising a rectangular wave guide section, a circular wave guide section, said rectangular wave guide being joined to said circular wave guide by a gradual transition, said circular wave guide being a radiating horn, a dielectric wedge mounted in said circular wave guide at an angle of 45 degrees to the plane of the electric intensity vectors in said circular wave guide, said configuration of said wedge producing circular polarization of the radiated energy from said horn, a double concave dielectric lens, said lens being mounted at the aperture of said radiating horn, the axis of said lens being coincident with the axis of said circular wave guide, and a metallic convex parabolic reflector, said reflector being mounted behind said lens with its axis coincident with the axis of said circular wave guide, said combination of said rectangular wave guide, said circular wave guide, said wedge, said lens and said reflector being adapted to produce a radiation pattern of uniform intensity at all points over a hemisphere.

3. An antenna for producing a radiation pattern of uniform intensity over substantially a hemispherical surface comprising, a vertical circular wave guide horn, a lens mounted in the upper end of said wave guide, means for energizing said guide at its lower end with plane polarized waves, means positioned within said guide for transforming plane polarized waves to circularly polarized waves, said lens focusing said circularly polarized waves prior to their radiation into free space, and a metallic convex parabolic reflector mounted coaxially with said wave guide near said upper end.

4. An antenna for producing a radiation pattern of uniform intensity over a hemisphere comprising, a vertical circular wave guide horn, a concave dielectric lens mounted in the aperture of said horn, means for illuminating said lens with circularly polarized wave energy, and a metallic convex parabolic reflector mounted coaxially with said wave guide behind said lens.

5. An antenna for producing a radiation pattern of uniform intensity over a hemisphere comprising, a vertical circular wave guide horn, a concave dielectric lens mounted in the aperture of said horn, means for energizing said wave guide with plane polarized energy, a dielectric wedge positioned within said wave guide at an angle of 45 degrees to the electric vector of said plane polarized energy for producing circular polarization, said lens focusing the circularly polarized energy prior to its radiation into free space and a metallic convex parabolic reflector mounted coaxially with said wave guide behind said lens.

6. An antenna comprising, a circular wave guide horn, means for producing circular polarization of the radiated energy from said horn, said means consisting of a dielectric wedge inserted at an angle of 45 degrees to the electric vector in said guide, a double concave dielectric lens mounted in the aperture of said horn, said lens being illuminated with the circularly polarized energy produced by said wedge, and a convex reflector positioned behind said lens, the combination of said horn, lens and reflector being effective to produce isotropic radiation over a hemisphere.

7. An antenna for producing isotropic radiation over a hemispherical surface comprising a wave guide, means for energizing one end of said guide, a double concave dielectric lens mounted in the aperture of said guide at the other end thereof, means within said guide for producing circularly polarized waves therein and a convex parabolic reflector mounted externally on and coaxially with said guide behind said lens, said reflector having a circular configuration in a plane perpendicular to the longitudinal axis of the guide with the convex surface of said reflector facing the direction of propagation of the radiated energy.

References Cited in the file of this patent
UNITED STATES PATENTS

| | | |
|---|---|---|
| 2,257,783 | Bowen | Oct. 7, 1941 |
| 2,283,568 | Ohl | May 19, 1942 |
| 2,283,935 | King | May 26, 1942 |
| 2,407,068 | Fiske et al. | Sept. 3, 1946 |
| 2,407,267 | Ginzton | Sept. 10, 1946 |
| 2,412,320 | Carter | Dec. 10, 1946 |
| 2,425,345 | Ring | Aug. 12, 1947 |
| 2,524,292 | Iams | Oct. 3, 1950 |